(12) United States Patent
Lin et al.

(10) Patent No.: US 11,435,812 B1
(45) Date of Patent: Sep. 6, 2022

(54) EFFICIENT UTILIZATION OF SPARE DATACENTER CAPACITY

(71) Applicant: Meta Platforms, Inc., Menlo Park, CA (US)

(72) Inventors: Kevin H. Lin, Cupertino, CA (US); Min Ni, Campbell, CA (US); Ephraim Donghyun Park, Newark, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 32 days.

(21) Appl. No.: 16/903,193

(22) Filed: Jun. 16, 2020

Related U.S. Application Data

(63) Continuation of application No. 15/832,704, filed on Dec. 5, 2017, now Pat. No. 10,719,120.

(51) Int. Cl.
| | | |
|---|---|---|
| *G06F 1/3287* | (2019.01) | |
| *G06F 1/3209* | (2019.01) | |
| *G06F 1/26* | (2006.01) | |
| *G06F 9/50* | (2006.01) | |

(52) U.S. Cl.
CPC ............ *G06F 1/3287* (2013.01); *G06F 1/266* (2013.01); *G06F 1/3209* (2013.01); *G06F 9/5094* (2013.01)

(58) Field of Classification Search
CPC ...... G06F 1/3287; G06F 1/266; G06F 1/3209; G06F 9/5094
See application file for complete search history.

(56) References Cited

U.S. PATENT DOCUMENTS

| | | |
|---|---|---|
| 8,255,915 B1 | 8/2012 | Blanding et al. |
| 8,566,627 B2 | 10/2013 | Halepete et al. |
| 9,146,814 B1 | 9/2015 | van der Merwe et al. |
| 9,229,507 B1 | 1/2016 | Hennecke et al. |
| 9,563,216 B1 | 2/2017 | Barroso et al. |
| 10,277,523 B2 | 4/2019 | Wu et al. |
| 10,331,198 B2 | 6/2019 | Wu et al. |
| 10,379,558 B2 | 8/2019 | Liang et al. |
| 10,528,115 B2 | 1/2020 | Deng et al. |
| 2004/0163001 A1 | 8/2004 | Bodas |
| 2008/0183769 A1 | 7/2008 | Regan et al. |
| 2008/0301479 A1 | 12/2008 | Wood |
| 2010/0070784 A1 | 3/2010 | Gupta et al. |
| 2010/0211810 A1 | 8/2010 | Zacho |
| 2011/0119191 A1* | 5/2011 | Stern ................... G06F 21/105 718/1 |
| 2011/0138037 A1 | 6/2011 | Sharma et al. |
| 2011/0289327 A1 | 11/2011 | Nolterieke et al. |
| 2013/0003574 A1 | 1/2013 | Hayashi et al. |
| 2013/0346774 A1 | 12/2013 | Bhandaru et al. |
| 2014/0052965 A1* | 2/2014 | Sarel ................... G06F 9/4893 712/214 |

(Continued)

*Primary Examiner* — Terrell S Johnson
(74) *Attorney, Agent, or Firm* — FisherBroyles, LLP

(57) ABSTRACT

A spare capacity status of each of multiple computing systems in a data center is monitored. Temporary workloads are assigned to these computing systems if there exists sufficient additional electrical power supply and capacity on power distribution lines. Thus, computing systems that are typically not productively used, such as those that are about to be decommissioned, have not yet been assigned for normal servicing, are reserved for special circumstances, or that are assigned to services that are currently in low demand, are temporarily used for productive data center purposes.

20 Claims, 7 Drawing Sheets

(56) References Cited

U.S. PATENT DOCUMENTS

| | | |
|---|---|---|
| 2014/0100706 A1 | 4/2014 | Khatri et al. |
| 2014/0149774 A1 | 5/2014 | Burns et al. |
| 2014/0258760 A1 | 9/2014 | Wells et al. |
| 2015/0006937 A1 | 1/2015 | Rotem et al. |
| 2015/0198995 A1 | 7/2015 | Muller |
| 2016/0006622 A1 | 1/2016 | Bednarz et al. |
| 2016/0048185 A1* | 2/2016 | Liang .................. G05F 1/66 713/340 |
| 2016/0050279 A1 | 2/2016 | Pahng |
| 2017/0160781 A1 | 6/2017 | Piga et al. |
| 2017/0192488 A1 | 7/2017 | Wu et al. |
| 2017/0195408 A1 | 7/2017 | Wu et al. |
| 2017/0235668 A9 | 8/2017 | Pillai et al. |
| 2019/0086891 A1 | 3/2019 | Kawamoto et al. |

* cited by examiner

EFFICIENT UTILIZATION OF SPARE DATACENTER CAPACITY

CROSS REFERENCE TO RELATED APPLICATION

This application is a continuation of U.S. application Ser. No. 15/832,704, filed on Dec. 5, 2017, the disclosure of which is incorporated, in its entirety, by this reference.

BACKGROUND

Data centers can be subdivided into physical suites, rows, and racks, and electrical power ("power") can be budgeted for each subdivision. A server computing device ("server") is typically a smallest computing unit in a data center. Multiple server computing devices can operate in a rack, which is a vertical collection of server computing devices. Multiple racks can be organized in rows, and multiple rows can be placed in a suite. To ensure that adequate power is supplied during a common or peak demand, the power can be "budgeted," meaning that various configuration limits can be placed based on the available power. For example, the number of rows, racks, or servers can be limited based on the available power. The budget may include a surplus allowance, e.g., to respond to unexpected surges in demand for power.

To ensure that the power draw does not exceed a budget for each subdivision, various circuit breakers (CBs) or other overcurrent protective devices (OPDs) may be placed in-line with the power supply. These OPDs can be triggered to switch off power when more power than expected is drawn. The amount of power that is supplied before the OPD is triggered to an off state can be a function of temperature: as temperature increases, the triggering current is reduced.

Servers can also be logically subdivided into "clusters," that can perform tasks jointly or commonly with other servers in the same cluster. For example, data center operators can subdivide servers logically into clusters of application (e.g., "front end" web servers), database servers, caching servers, and so forth. These various "types" of servers may be configured with different hardware and/or software. For example, application servers may be configured with superior class of central processing units (CPUs) but reduced secondary storage space (e.g., hard disk drives, solid state drives, or other data storage devices) as compared to database servers. In contrast, caching servers may be configured with very fast solid-state drives with a high amount of capacity. The various components of these different server configurations (e.g., CPU, data storage device, etc.) can consume different amounts of power.

Although data center operators, application developers, database administrators, and others may design a server infrastructure and distribute data in such a way that demand for server computing devices balanced across multiple servers in a cluster, there can be unexpected bursts of demand. As an example, in a social network application, although activity by users can be generally predicted with a reasonable degree of confidence, a surge in activity can occur when celebrities post videos, "updates," live stream videos, or otherwise engage with their fans. Failing to respond to such bursts of demand can cause various unintended overall degradation of performance. As an example, if a caching server is negatively impacted by a surge in demand, the performance degradation can impact many other servers and/or applications and services. As another example, a video or a video stream may need a large number of servers to transcode or otherwise process the videos.

Datacenter operators will sometimes decommission and remove some servers, e.g., because their expected lifetime has expired, new server technology is available, or for other reasons. These servers are then physically dismantled and removed from the datacenters to make way for new servers. However, because the number of servers to be decommissioned can number in the thousands, decommissioning them can be a labor-intensive process and so these servers may remain in an idle state in the datacenters for a period of time. These servers may remain unutilized or underutilized in the datacenters because "production" services typically cannot be reliably assigned to these servers, e.g., because the servers may be turned off and/or removed at short notice.

The Background section of this document is provided to place embodiments of the disclosed technology in technological and operational context to assist those of skill in the art in understanding their scope and utility. Unless explicitly identified as such, no statement herein is admitted to be prior art merely by its inclusion in the Background section.

BRIEF DESCRIPTION OF THE DRAWINGS

The embodiments may be better understood by referring to the following Detailed Description in conjunction with the accompanying drawings, in which like reference numerals indicate identical or functionally similar elements.

DETAILED DESCRIPTION

Overview

Figure 1:
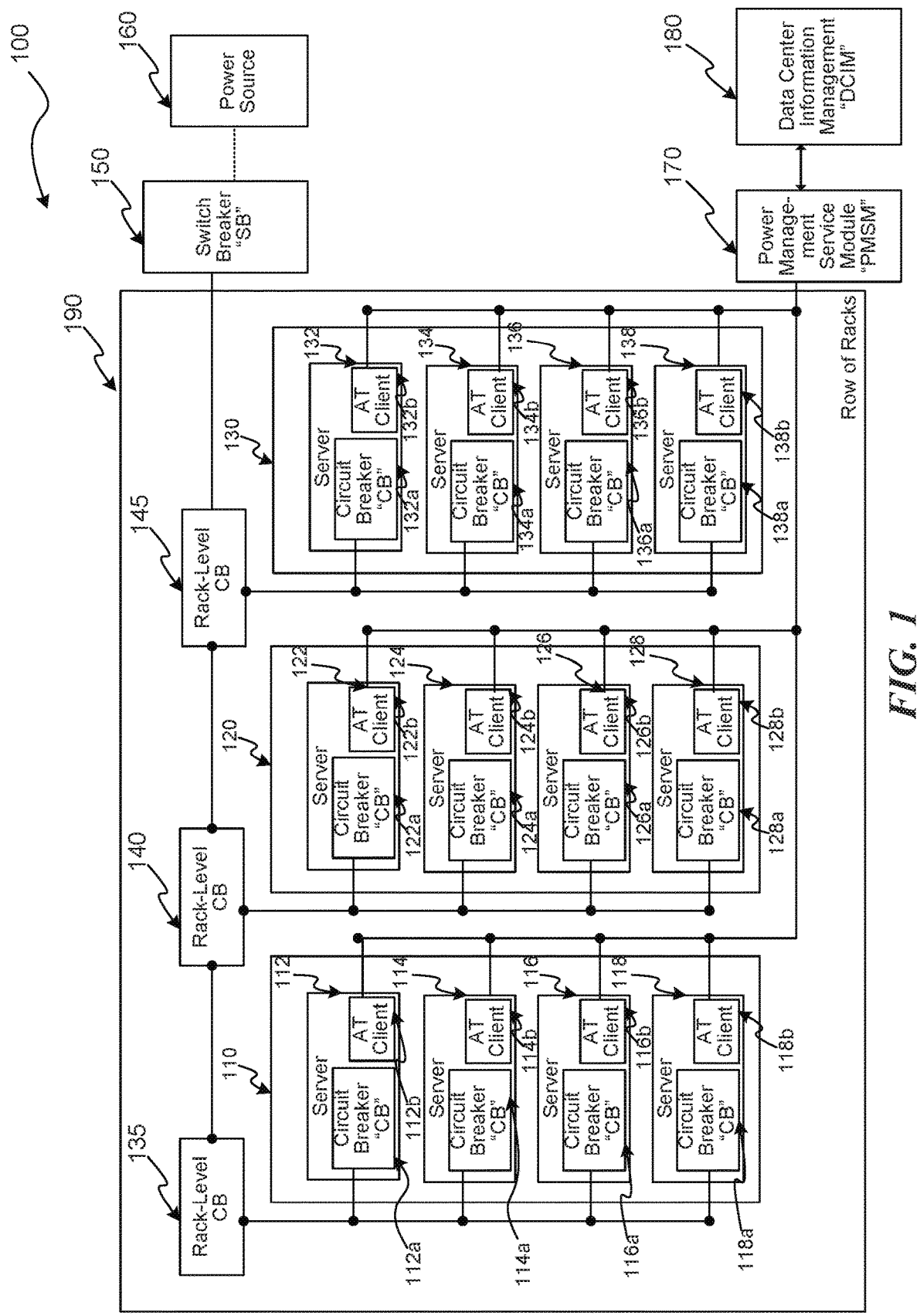
FIG. 1 is a schematic drawing illustrating components of a data center, consistent with various embodiments.

Various embodiments are disclosed herein for efficiently utilizing spare datacenter capacity. In various implementations, this spare capacity can come from servers in datacenters that are scheduled to be decommissioned; newly connected servers that are not yet assigned to provide particular services; servers whose capacity is reserved for special circumstances, such as urgent requests or emergencies; or unused or underutilized capacity identified on servers allocated to other services, e.g. during non-peak hours. In various embodiments, a datacenter management service component orchestrates allocation of services to the spare capacity of datacenter servers, e.g., based on available electrical power budget.

For spare capacity available from servers that will be decommissioned, the datacenter management service can be provided a schedule of the datacenter servers that will be decommissioned. The schedule is then kept up-to-date so that the datacenter management service always has an accurate list of servers that will be decommissioned and a date and possibly time they are expected to be decommissioned. Before physically decommissioning a particular server, the operator may signal the datacenter management service that the particular server is to be decommissioned.

Similarly, for newly connected servers, the datacenter management service can be provided a schedule of the for newly connected servers. The schedule can then be updated so the datacenter management service has an accurate list of newly added servers and a date and possibly time they are expected to be assigned other services to provide. Before transferring the newly connected server to provide other services, the operator may signal the datacenter management service that the particular server is being reassigned.

In some implementations, servers having unused or underutilized capacity or servers whose capacity is reserved for special circumstances can be identified to the datacenter management service with a specified amount of time that these servers are to be available to provide other services. Thus, the datacenter management service will have a list of this type of available server and a date and possibly time they are to be assigned back to their normal servicing. In some implementations, servers having unused or underutilized capacity or servers whose capacity is reserved for special circumstances can be identified to the datacenter management service without any specification of when these servers need to be reassigned to other servicing. The datacenter management service can limit the use of such servers to provides services where the impact will be minimized if processes are uncompleted, suddenly have less resources to utilize, or to have to be haulted or transferred to other servers.

The datacenter management service can be requested to allocate servers to complete a temporary surge in demand for a service (e.g., a workload or "temporary workload"). The request can specify a type of server (e.g., processor type, speed, memory, available storage, etc.) and the expected longevity of the service. Various types of workloads may benefit from the disclosed embodiments. These workloads can be short-lived and/or easily transferred between servers. Typically, these workloads satisfy temporary surges in demand. For example, a social networking service provider may need to quickly transcode video, perform machine learning, or complete other tasks.

In some implementations, the datacenter management service can also automatically select services to perform when it identifies that spare capacity is available. In some implementations, the datacenter management service can limit the type of service it automatically selects to services that have been identified as being non-critical or that have been identified as not needing a result in a particular timeframe. This type of service is referred to herein as a "zero-priority" service.

Once a service to perform has been identified, either through a service request or as a zero-priority service, the datacenter management service can select a datacenter or server cluster that has sufficient available power to run the service on one or more of the requested type of servers. To query for available electrical power, the datacenter management service can query a power budget service of the types described in U.S. patent application Ser. No. 15/709,434 and entitled "Obtaining Smoother Power Profile and Improved Peak-Time Throughput in Datacenters;" and U.S. patent application Ser. No. 14/458,677 and entitled "Dynamically Responding to Demand for Server Computing Resources," the disclosures of which are incorporated herein in their entireties.

In various embodiments, the datacenter management service may initially select a datacenter or server cluster that has the most available (e.g., unused) power budget. A server cluster is typically a group of proximately located servers in a same datacenter. The datacenter management service can then allocate additional servers to the same datacenter and/or server cluster, based on the available electrical power budget. If there is insufficient available power, the datacenter management service can then select a different server cluster or datacenter to which to allocate additional servers required to complete the requested workload. In various embodiments, the datacenter management service may select server clusters based on the least impact to the power requirements for that server cluster.

In various embodiments, requests for servers made to the datacenter management service may specify a priority. High priority requests may be allocated servers and completed before lower priority requests. In some embodiments, a high priority request may displace a previously allocated lower priority service. In some implementations, the zero-priority services can be assigned the lowest priority value.

While the spare capacity is being used by a service assigned by the datacenter management service, one of more of the servers that provide the spare capacity can become unavailable to continue performing the assigned service. For example, servers to be decommissioned can be powered off, newly added servers can be assigned to a cluster for normal operations, a special circumstance can occur triggering use of the servers whose capacity is reserved for those circumstances, or servers identified as having unused capacity can be assigned back to their normal services. In some implementations, these unavailability determinations can be based on one of the schedules the datacenter management service maintains for decommissioned, new, or temporally reassigned servers. In some implementations, these unavailability determinations can be based on the datacenter management service receiving a notification indicating one of the conditions for the spare capacity ending. In either case, the datacenter management service can move the services running on the servers to be decommissioned or reallocated to other servers that have spare capacity. If no such spare capacity is available, the datacenter management service can halt the services. In some implementations, data used by the halted services can first be stored so the services can be resumed when spare capacity becomes available. In some cases, however, the services that are allocated by the datacenter management service will complete their work before the spare capacity becomes unavailable because the datacenter management service can use its schedules for the decommissioned, new, or temporally reassigned servers to only assign services to servers that are expected to be completed before the assigned spare capacity servers are scheduled to become unavailable.

Thus, the datacenter management service is capable of increasing the efficient use of spare datacenter capacity.

In various embodiments, the datacenter management service employs a power management service that is configured for managing power and thermal issues in data centers, e.g., at a suite level (or other physical subdivisions of server computing devices) or at a cluster level (or other logical subdivisions of server computing devices). The power management service is capable of checking the available electrical power buffer to determine if additional electrical power is available that, if drawn, would not trigger power protection systems, e.g., circuit breakers. The power management service may also check for expected thermal changes. If it is possible to assign additional power to server computing devices without triggering power or thermal protection systems, the power management service may indicate that a server can be allocated a workload.

General Description

Various examples of the systems and services introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Several embodiments are described in more detail in reference to the Figures. Turning now to Figures, FIG. 1 is a schematic drawing illustrating components of a data center, consistent with various embodiments. Components 100 can include racks 110, 120, and 130 together (possibly with other racks, not illustrated) in a row of racks 190. Each rack can have one or more server computing devices ("servers"), e.g., servers 112, 114, 116, 118, 122, 124, 126, 128, 132, 134, 136, and 138. Servers 112, 114, 116, and 118 are in rack 110, servers 122, 124, 126, and 128, are in rack 120, and servers 132, 134, 136, and 138 are in rack 130. The racks 110, 120, and 130, each have an associated rack-level circuit breaker (CB), e.g., CB 135, CB 140, and CB 145, respectively. Each CB is in-line between its corresponding rack and a power source 160. Each server has its own CB, e.g., CBs 112a, 114a, 116a, 118a, 122a, 124a, 126a, 128a, 132a, 134a, 136a, and 138a corresponding to servers 112, 114, 116, 118, 122, 124, 126, 128, 132, 134, 136, and 138, respectively. Furthermore, a switch breaker (SB) 150 is in-line between the power source 160 and the row of racks 190. As is known in the art, the various SBs and CBs are designed to limit power that is drawn, and can have a power rating or capacity. The power capacity of the CBs and SBs can decrease as temperature increases. Each server 112, 114, 116, 118, 122, 124, 126, 128, 132, 134, 136, and 138 also has associated therewith a client module ("AT client"), e.g., AT clients 112b, 114b, 116b, 118b, 122b, 124b, 126b, 128b, 132b, 134b, 136b, and 138b corresponding to servers 112, 114, 116, 118, 122, 124, 126, 128, 132, 134, 136, and 138, respectively. The AT clients can be software or hardware components designed to monitor and control aspects of the servers, e.g., power utilization, thermal load (e.g., processor temperature), etc. The AT clients may be controlled, e.g., via an operating system executing at the servers, to monitor or configure processors associated with their corresponding server, e.g., via an application program interface (API). The components 100 can also include power management service module 170 and a data center information management (DCIM) component 180. The DCIM component is also referred to herein as a datacenter management service. The power management service module can communicate with the various AT clients 112b, 114b, 116b, 118b, 122b, 124b, 126b, 128b, 132b, 134b, 136b, and 138b, e.g., to monitor and/or configure their corresponding processors. The AT service module 170 can also exchange data with the DCIM component 180, e.g., to determine how much power is presently being drawn by the various servers, racks, or other data center components.

Figure 2:
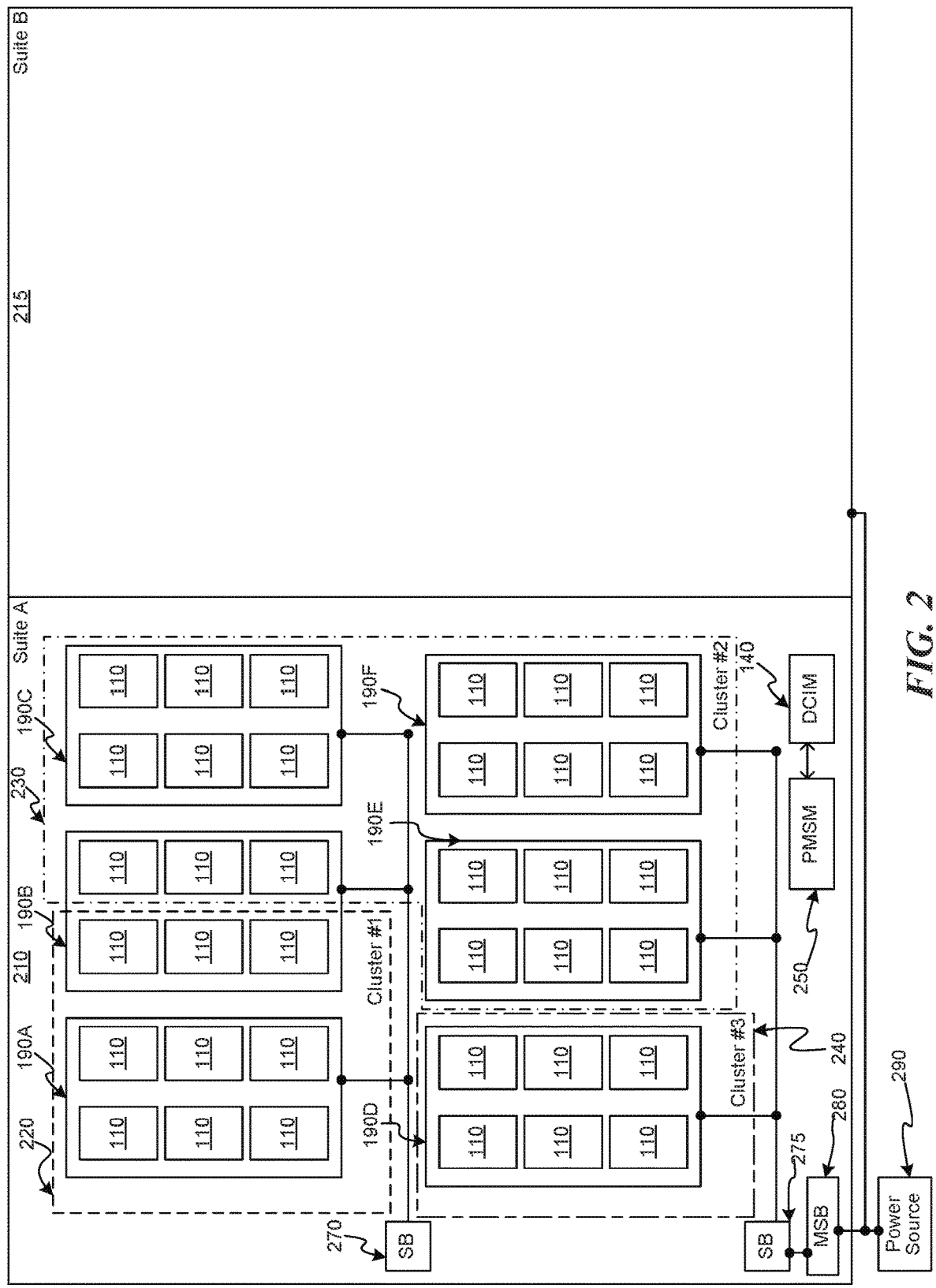
FIG. 2 is a schematic drawing illustrating components of a data center, consistent with various embodiments.

FIG. 2 is a schematic drawing illustrating components of a data center, consistent with various embodiments. The illustrated data center has two "suites," suite A 210 and suite B 220. Additional suites (not illustrated) can also exist. The various suites each draw power from a power source 290, e.g., via an in-line master switch breaker (MSB) 280. The power is then supplied via SBs, e.g., SBs 270 and 275, to one or more rows of racks 190. As described above in relation to FIG. 1, each rack 190 can have associated therewith one or more racks 110. In various embodiments, rows of racks 190, racks 110, or even various servers of each rack (illustrated in FIG. 1) can be logically configured as "clusters." A cluster is a group of servers that can perform tasks jointly or commonly with other servers in the same cluster. In the illustrated example, each cluster is circumscribed by dashed line segments. Cluster #1 (220) includes a full row of racks 190A and shares a half row of racks 190B with cluster #2 (230). Cluster #3 (240) has a single row of racks 190D. Cluster #2 (230) has three full rows of racks 190C, 190E, and 190F, and shares the half row of racks 190B with cluster #1 (220). In various embodiments, clusters may be limited to a single row of racks, multiple full rows or racks, or even a single rack. The Power Management Service Module ("PMSM") 250 and the DCIM 140 may together monitor power usage, temperature, and other attributes across the various components of one or more suites.

Figure 3A:
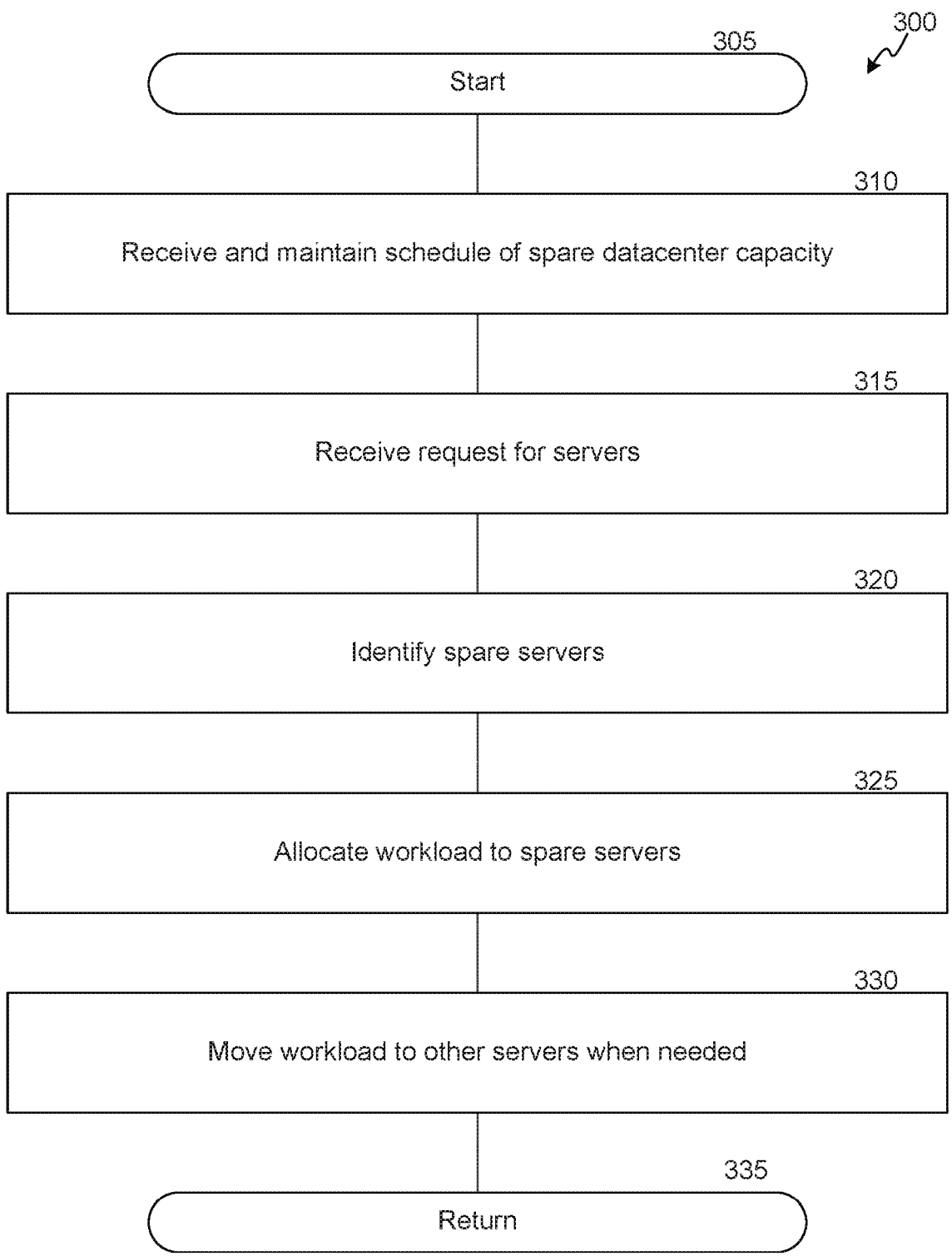
FIGS. 3A and 3B are flow diagrams illustrating routines invoked by various embodiments.

FIG. 3A is a flow diagram illustrating a routine 300 invoked by various embodiments, e.g., to allocate workload to spare datacenter servers. The routine 300 begins at block 305. At block 310, the routine 300 receives and/or maintains schedule of spare datacenter capacity. As examples, an operator may indicate that particular servers are to be decommissioned and may specify a date and possibly time when the servers will be powered off; that newly connected servers are available and may specify a date and possibly time when the servers will be assigned to provide particular services; that there are servers with unused capacity and may specify a date and possibly time when the servers are expected to be used for special circumstances or will be again assigned to provide their usual services. The various server availability schedules may be updated from time to time. The datacenter management service can attempt to allocate services to these servers in such a manner that the workload will be completed prior to indicated dates/times the servers will no longer be available to provide spare capacity. In some implementations, some servers that might otherwise be available to provide spare capacity are exempted from being assigned services by the datacenter management service. For example, these exempted servers can include one or more of: servers in maintenance mode or have been identified for repair or security issues; servers in regions that are not online yet; servers restricted due to power budget; servers that do not have specified hardware specification (e.g. hardware that is sufficient to execute common killable services), or any combination thereof.

At block 315, the routine 300 receives a request for servers. The request can specify, e.g., a number of servers required, one or more types of servers required, and/or an expected duration for completion of a task or workload. These numbers can be previously determined, e.g., by a system operator or automatically. The request may also indicate a workload (e.g., a uniform resource locator or "URL" from which to retrieve a script or executable code). Alternatively, at block 315, routine 300 can identify a zero-priority service to perform. In some implementations, similarly to the requested service, a zero-priority service can be associated with a number of servers required, one or more types of servers required, and/or an expected duration for completion of a task or workload.

Figure 3B:
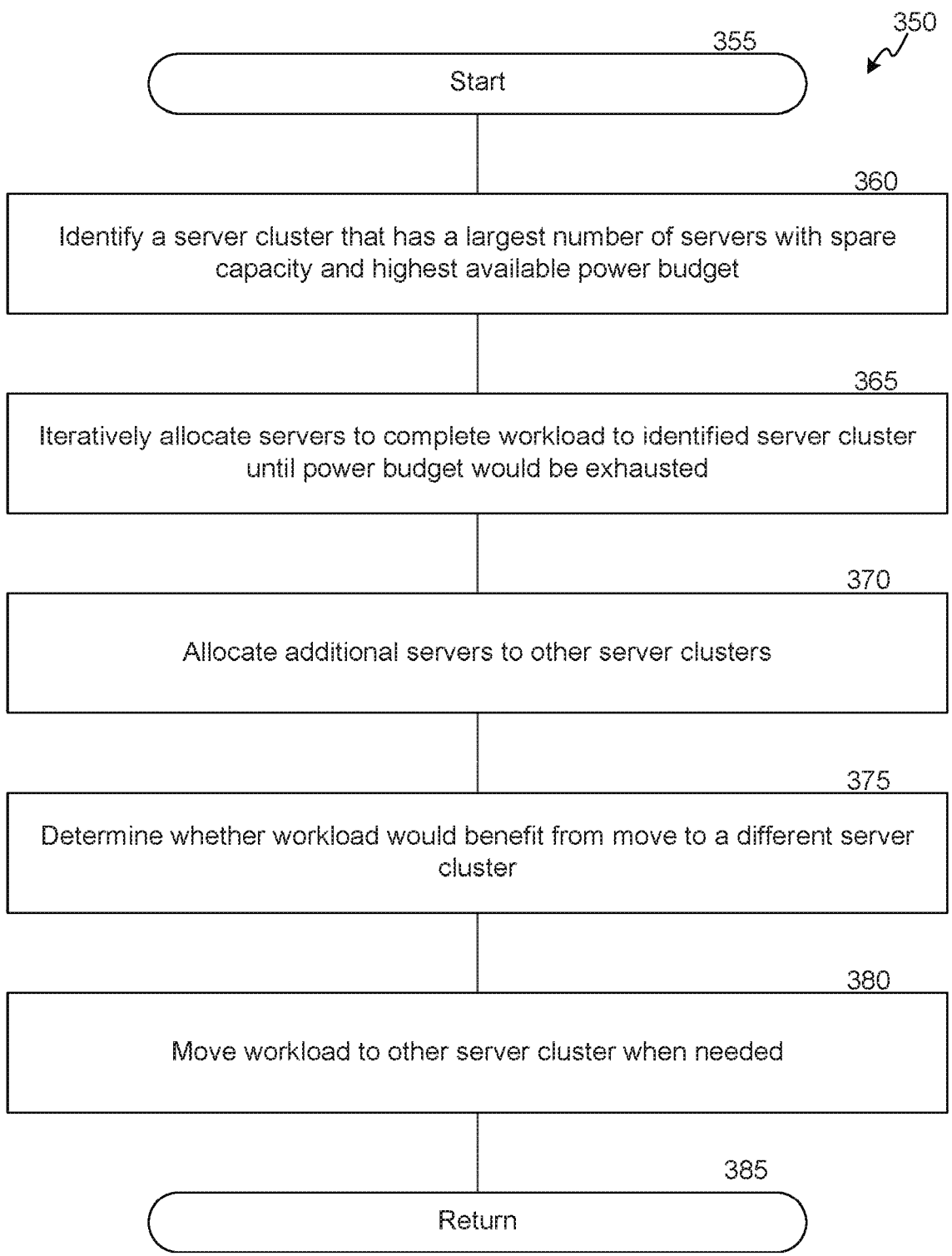

At block 320, the routine 300 identifies spare servers. The process for identifying spare servers is illustrated in FIG. 3B and described in further detail below.

At block 325, the routine 300 assigns (also referred to herein as "allocates"), to one or more of the spare servers identified by the subroutine illustrated at block 320, the workload identified at block 315. Assigning a workload may include transmitting the URL received with the request. The routine 300 may also store an indication of which server(s) various workloads are assigned to. In various embodiments, the workloads maybe capable of being stopped and restarted abruptly, e.g., because the assigned servers are decommissioned or reassigned sooner than anticipated or fail unexpectedly. As an example, a video transcoding routine may re-start the transcoding at an altogether different server.

At block 330, the routine 300 can monitor the workload and move it to different servers. As examples, if a different server becomes available that is in the same cluster as other servers where related workloads are being handled, the routine 300 may move the workload to those servers. Alternatively, if the routine 300 determines that the workload is causing too much network traffic between two servers or data centers, the routine 300 may move the workload to a different server or data center to reduce the network traffic.

The routine returns at block 335.

Those skilled in the art will appreciate that the logic illustrated in FIGS. 3A and 3B and described above, and in each of the flow diagrams discussed below, may be altered in various ways. For example, the order of the logic may be rearranged, substeps may be performed in parallel, illustrated logic may be omitted, other logic may be included, etc.

FIG. 3B is a flow diagram illustrating a routine 350 invoked by various embodiments, e.g., to identify spare servers. In various embodiments, the routine 350 is invoked by routine 300 when assigning workloads. The routine 350 begins at block 355.

At block 360, the routine 350 identifies a server cluster that has a largest number of servers with spare capacity and a highest available electrical power budget. At any given time, there may be multiple servers waiting to be decommissioned, to be assigned to their usual tasks, or that have available capacity. However, some may be in an area (e.g., cluster, data center, rack, etc.) that does not have sufficient electrical power to run an additional one or many servers. Thus, the routine attempts to identify in a "greedy" manner a server cluster that may be capable of accommodating multiple workloads. In various embodiments, other algorithms may be employed to identify a server cluster.

At block 365, the routine 350 iteratively allocates servers in the server cluster identified at block 360 to complete the workload until the electrical power budget would be exhausted. For example, the routine 350 may assign N additional servers until assigning the N+1 server would cause too much electrical power to be used.

At block 370, the routine 350 allocates additional servers required to complete the workload to other server clusters, e.g., by calling the routine 350 iteratively or recursively. As an example, during a second iteration, the routine 350 may identify a different server cluster that has the second-most number of available servers and second-highest available power budget.

At block 375, the routine 350 determines whether any the assigned workload would benefit from being moved to a different server (or server cluster). If so, the routine 350 moves the workload at block 380.

The routine returns at block 385.

Figure 4:
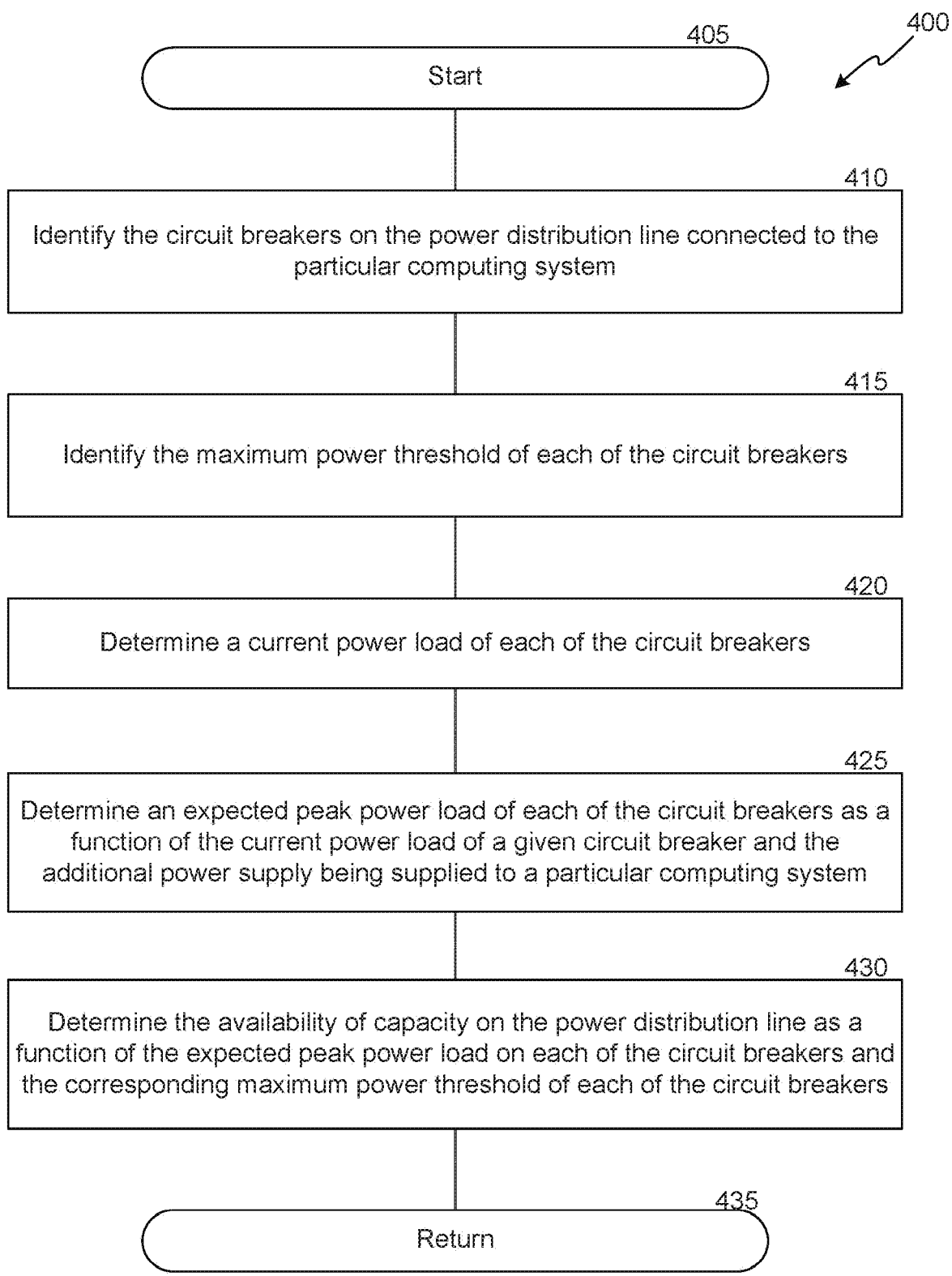
FIG. 4 is a flow diagram illustrating a routine invoked by various embodiments.

FIG. 4 is a flow diagram illustrating a routine 400 invoked by various embodiments, e.g., to determine how much electrical power can be supplied to a computing system identified by the routines of FIGS. 3A and/or 3B. The routine 400 begins at block 405. At block 410, the routine 400 identifies CBs in-line on the electrical power distribution line connected to an identified computing system (e.g., the computing system identified above in relation to FIG. 5). At block 415, the routine 400 identifies the maximum power threshold of each of the in-line CBs. At block 420, the routine 400 determines a current electrical power load on each of the identified CBs. As an example, the routine can query the DCIM or other components to determine the current power load for other components in-line with the identified computing system. At block 425, the routine 400 determines an expected peak electrical power load of each of the CBs as a function of the current electrical power load of a given CB and the additional power supply being supplied to the identified computing system. At block 430, the routine 400 determines the availability of electrical capacity on the electrical power distribution line as a function of the expected peak electrical power load on each of the CBs and the corresponding maximum electrical power threshold of each of the in-line CBs. At block 435, the routine 400 returns.

Figure 5:
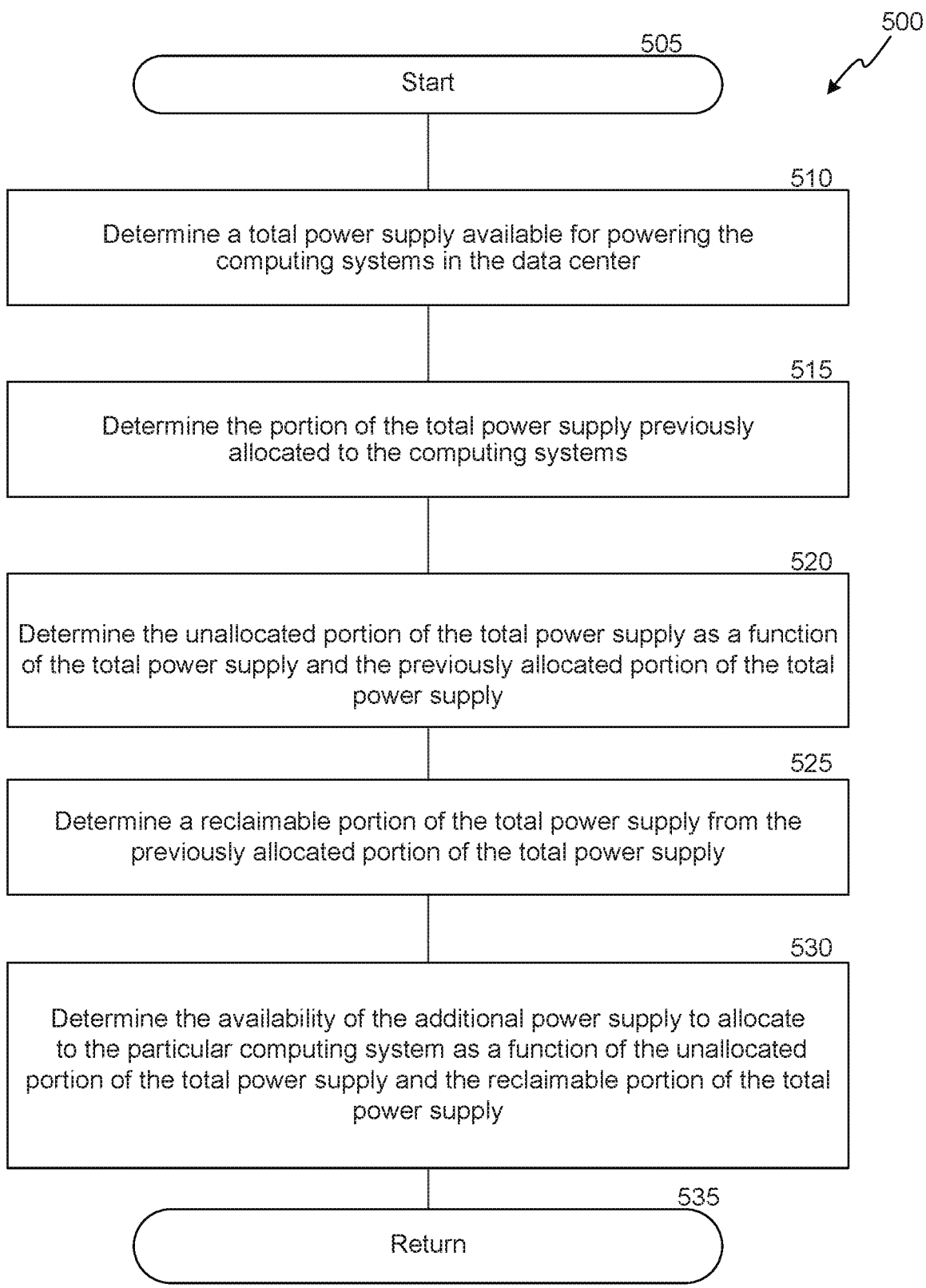
FIG. 5 is a flow diagram illustrating a routine invoked by various embodiments.

FIG. 5 is a flow diagram illustrating a routine 500 invoked by various embodiments, e.g., to reclaim power supply previously provided to an identified computing system. The routine 500 begins at block 505. At block 510, the routine 500 determines a total electrical power supply available for powering the computing systems in the data center. At block 515, the routine 500 determines the portion of the total electrical power supply previously allocated to the computing systems. At block 520, the routine 500 determines the unallocated portion of the total electrical power supply as a function of the total electrical power supply and the previously allocated portion of the total electrical power supply. At block 525, the routine 500 determines a reclaimable portion of the total electrical power supply from the previously allocated portion of the total electrical power supply. At block 530, the routine 500 determines availability of the additional electrical power supply to an identified computing system as a function of the unallocated power of the total electrical power supply and the reclaimable portion of the total electrical power supply. The routine 500 then returns at block 535.

Figure 6:
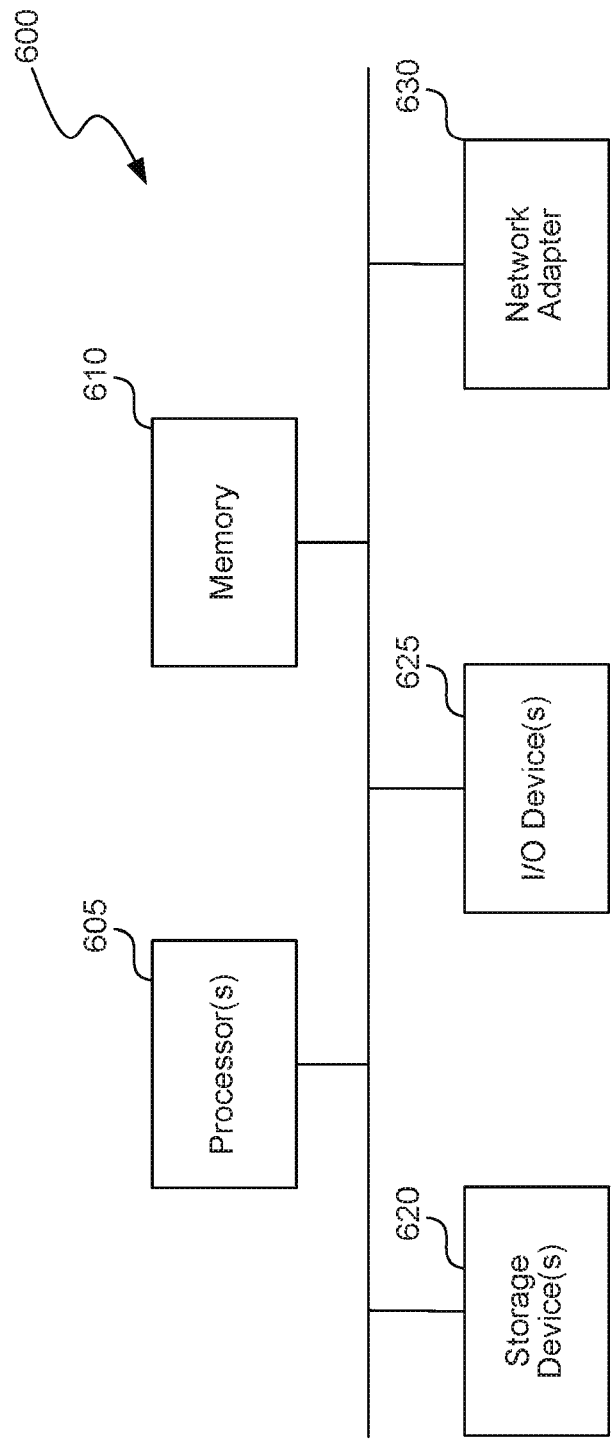
FIG. 6 is a block diagram of a computer system as may be used to implement features of some of the embodiments.

FIG. 6 is a block diagram of a computer system as may be used to implement features of some of the embodiments. The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C)

bus, or an Institute of Electrical and Electronics Engineers (IEEE) standard 1394 bus, also called "Firewire".

The memory 610 and storage devices 620 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

What is claimed is:

1. A method comprising:
    receiving, by a processor, a request for a computing system that specifies criteria for completion of a temporary workload by the computing system;
    monitoring, by the processor, a spare capacity status of each of multiple computing systems in a data center;
    identifying at least one computing system of the multiple computing systems that has spare capacity and is available to complete a workload;
    determining that the at least one computing system of the multiple computing systems meets or exceeds the specified criteria to complete the temporary workload;
    determining that an available electrical power budget for the at least one computing system is sufficient to complete the temporary workload; and
    allocating the temporary workload to the at least one computing system.

2. The method of claim 1, wherein the criteria for completion of the temporary workload comprises a requirement for a number of servers included in the computing system.

3. The method of claim 1, wherein the criteria for completion of the temporary workload comprises a requirement for one or more types of servers included in the computing system.

4. The method of claim 1, wherein the criteria for completion of the temporary workload comprises an expected duration for completion of the workload.

5. The method of claim 1, wherein:
the temporary workload is a uniform resource locator from which to retrieve executable code; and
allocating the temporary workload to the at least one computing system comprises transmitting the uniform resource locator to the at least one computing system.

6. The method of claim 1, wherein the temporary workload is a zero-priority service.

7. The method of claim 1, wherein allocating the temporary workload to the at least one computing system comprises sending a signal to the at least one computing system to retrieve the temporary workload.

8. The method of claim 1, wherein allocating the temporary workload to the at least one computing system comprises identifying a cluster of computing systems that has a highest number of computing devices with spare capacity and a highest available electrical power budget.

9. The method of claim 8, wherein allocating the temporary workload to the at least one computing system further comprises iteratively allocating the temporary workload to computing devices in the identified cluster of computing systems until an available electrical power budget for the identified cluster is exhausted.

10. The method of claim 9, wherein if the spare capacity of an allocated computing device becomes unavailable before completion of a portion of the temporary workload assigned to it, causing the portion of the temporary workload to be re-started at a different computing device.

11. A system, comprising:
at least one physical processor;
physical memory comprising computer-executable instructions that, when executed by the physical processor, cause the physical processor to:
receive a request for a computing system that specifies criteria for completion of a temporary workload by the computing system;
monitor a spare capacity status of each of multiple computing systems in a data center;
identify at least one computing system of the multiple computing systems that has spare capacity and is available to complete a workload;
determine that the at least one computing system of the multiple computing systems meets or exceeds the specified criteria to complete the temporary workload;
determine that an available electrical power budget for the at least one computing system is sufficient to complete the temporary workload; and
allocate the temporary workload to the at least one computing system.

12. The system of claim 11, wherein the criteria for completion of the temporary workload comprises a requirement for a number of servers included in the computing system.

13. The system of claim 11, wherein the criteria for completion of the temporary workload comprises a requirement for one or more types of servers included in the computing system.

14. The system of claim 11, wherein the criteria for completion of the temporary workload comprises an expected duration for completion of the workload.

15. The system of claim 11, wherein:
the temporary workload is a uniform resource locator from which to retrieve executable code; and
allocating the temporary workload to the at least one computing system comprises transmitting the uniform resource locator to the at least one computing system.

16. The system of claim 11, wherein the temporary workload is a zero-priority service.

17. A non-transitory computer-readable medium comprising one or more computer-executable instructions that, when executed by at least one processor of a computing device, cause the computing device to:
receive a request for a computing system that specifies criteria for completion of a temporary workload by the computing system;
monitor a spare capacity status of each of multiple computing systems in a data center;
identify at least one computing system of the multiple computing systems that has spare capacity and is available to complete a workload;
determine that the at least one computing system of the multiple computing systems meets or exceeds the specified criteria to complete the temporary workload;
determine that an available electrical power budget for the at least one computing system is sufficient to complete the temporary workload; and
allocate the temporary workload to the at least one computing system.

18. The non-transitory computer-readable medium of claim 17, wherein the criteria for completion of the temporary workload comprises a requirement for a number of servers included in the computing system.

19. The non-transitory computer-readable medium of claim 17, wherein the criteria for completion of the temporary workload comprises a requirement for one or more types of servers included in the computing system.

20. The non-transitory computer-readable medium of claim 17, wherein the criteria for completion of the temporary workload comprises an expected duration for completion of the workload.

* * * * *

UNITED STATES PATENT AND TRADEMARK OFFICE
CERTIFICATE OF CORRECTION

| | | |
|---|---|---|
| PATENT NO. | : 11,435,812 B1 | Page 1 of 1 |
| APPLICATION NO. | : 16/903193 | |
| DATED | : September 6, 2022 | |
| INVENTOR(S) | : Lin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 259 days.

Signed and Sealed this
Eleventh Day of February, 2025

Coke Morgan Stewart
*Acting Director of the United States Patent and Trademark Office*